(12) United States Patent
Nguyen et al.

(10) Patent No.: US 6,253,092 B1
(45) Date of Patent: *Jun. 26, 2001

(54) CLOSED LOOP TRANSMITTER WITH DAC SENSITIVITY ADJUSTED TO DETECTOR NONLINEARITY

(75) Inventors: Hoi Nguyen, Lemon Grove; Stephen J. Brown, San Diego, both of CA (US)

(73) Assignee: Uniden Financial, Inc., Fort Worth, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/977,954

(22) Filed: Nov. 25, 1997

(51) Int. Cl.$^7$ ....................................... H04B 1/40
(52) U.S. Cl. .......................... 455/522; 455/126
(58) Field of Search ............................ 455/69, 522, 127, 455/126; 327/362

(56) References Cited

U.S. PATENT DOCUMENTS

| | | | |
|---|---|---|---|
| 4,241,450 | * 12/1980 | Blatter et al. | 455/182.3 |
| 4,358,791 | * 11/1982 | French | 455/260 |
| 4,364,026 | * 12/1982 | Steckler et al. | 455/180.1 |
| 4,385,315 | * 5/1983 | George et al. | 455/182.3 |
| 4,870,698 | * 9/1989 | Katsuyama et al. | 455/127 |
| 4,885,798 | * 12/1989 | Jinich et al. | 455/69 |
| 5,003,619 | * 3/1991 | Morris et al. | 455/127 |
| 5,212,823 | * 5/1993 | Fujii et al. | 455/522 |
| 5,299,226 | * 3/1994 | Schilling | 455/522 |
| 5,386,588 | * 1/1995 | Yasuda | 455/69 |
| 5,386,589 | * 1/1995 | Kanai | 455/522 |
| 5,524,287 | * 6/1996 | Yokoya et al. | 455/69 |
| 5,548,616 | * 8/1996 | Mucke et al. | 455/522 |
| 5,574,984 | * 11/1996 | Reed et al. | 455/69 |
| 5,631,921 | * 5/1997 | Schilling | 455/522 |

* cited by examiner

Primary Examiner—Vivian Chang
Assistant Examiner—Eliseo Ramos-Feliciano
(74) Attorney, Agent, or Firm—William J. Benman

(57) ABSTRACT

A power control circuit for use with a closed loop transmitter such as a cellular telephone. The inventive circuit includes a first element for providing a transmitter output signal. A second element serves to receive a power level signal. A third element is included for adjusting the transmitter output signal in response to the power level signal in accordance with a first scale factor over a first range if the power level signal is below a first threshold and for adjusting the transmitter output signal in response to the power level signal in accordance with a second scale factor over a second range if the power level signal is not below the first threshold. In the illustrative embodiment, the system is adapted for use in a mobile station of a cellular telephone system to which a power level control signal is supplied by a base station thereof. The first element is a variable gain amplifier, the second element is a microprocessor. The third element includes a digital-to-analog converter, a detector for detecting a peak amplitude of the output, a subtractor for subtracting the output of the detector from a reference voltage. The reference voltage is supplied by the digital-to-analog converter. The output of the subtractor is input to a variable gain control input of the variable gain amplifier. The invention affords an improved design for a cellular telephone transmitter including a modulator for upconverting in input signal; a variable gain amplifier, a feedback loop coupled to the output of the amplifier and a gain varying input thereof and a circuit for adjusting the response of the feedback loop in response to changes in an applied control voltage.

11 Claims, 5 Drawing Sheets

SLIDING SCALE OF FULL SCALE INPUT
FOR DIFFERENT INPUT POWERS

CLOSED LOOP TRANSMITTER WITH DAC SENSITIVITY ADJUSTED TO DETECTOR NONLINEARITY

BACKGROUND OF THE INVENTION

1. Field of the Invention

The present invention relates to mobile communications systems. More specifically, the present invention relates to systems and techniques for controlling the power radiated by cellular transmitters.

2. Description of the Related Art

In a cellular network a large number of mobile telephone system users, each having a cellular phone, communicate through repeaters or terrestrial stations organized in a number of cells which extend over a limited geographical area. The terrestrial stations are referred to as 'base stations'.

Each mobile station (MS), e.g. cellular telephone, broadcasts a signal that is received by a base station. The signal is then relayed to a mobile switching center (MSC) which in turn routes the signal to the public switched telephone network (PTSN) and to telephone lines or other mobile stations. Similarly, a signal may be transmitted from the public switched telephone network to a mobile station via a base station and a mobile switching center.

In certain cellular systems such as GSM (Global Systems for Mobile Communication) there is a requirement to control, inter alia, the radio frequency (RF) power level of each cellular telephone transmitter in order to maximize the capacity of the system. The output power must be controlled over a wide range i.e., 30–40 dB.

One conventional technique for effecting control of the power level of each cellular phone is a closed loop approach wherein a signal is transmitted from a base station which sets the required output power level. The conventional, closed loop approach involves a feedback of the transmitter output to the input thereof via a peak detector, comparator, and variable gain amplifier.

However, this technique has been somewhat problematic inasmuch as the peak detector is generally implemented with a diode and a low pass filter. The response curve of the diode, with regard to its output voltage as a function of input power, is nonlinear over a wide range of input power levels. The nonlinearity is most extreme at low power levels. As a result, the feedback loop is nonlinear and extremely sensitive at low power levels. Inasmuch as the control voltage is typically applied using a digital-to-analog converter or 'DAC', a high resolution DAC is required to provide adequate resolution in the control of the applied voltage at the low end where the detector is most sensitive. Moreover, to ensure loop accuracy is maintained, steps must be taken to ensure the closed-loop remains stable. Methods such as changing the loop gain of the transmitter have been employed with limited success.

Hence a need exists in the art for an inexpensive system or technique for controlling the output power of a cellular telephone transmitter.

SUMMARY OF THE INVENTION

The need in the art is addressed by the present invention which in a most general sense is a power control circuit for use with a closed loop transmitter such as a cellular telephone. The inventive circuit includes a first element for providing a transmitter output signal. A second element serves to receive a power level signal. A third element is included for adjusting the transmitter output signal in response to the power level signal in accordance with a first scale factor over a first range if the power level signal is below a first threshold and for adjusting the transmitter output signal in response to the power level signal in accordance with a second scale factor over a second range if the power level signal is not below the first threshold.

In the illustrative embodiment, the system is adapted for use in a mobile station of a cellular telephone system to which a power level control signal is supplied by a base station thereof. The first element is a variable gain amplifier, the second element is a microprocessor. The third element includes a digital-to-analog converter, a detector for detecting a peak amplitude of the output, and a subtractor for subtracting the output of the detector from a reference voltage. The reference voltage is supplied by the digital-to-analog converter. The output of the subtractor is input to a variable gain control input of the variable gain amplifier.

The invention affords an improved design for a cellular telephone transmitter including a modulator for upconverting in input signal; a variable gain amplifier, a feedback loop coupled to the output of the amplifier and a gain varying input thereof and a circuit for adjusting the response of the feedback loop in response to changes in an applied control voltage.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
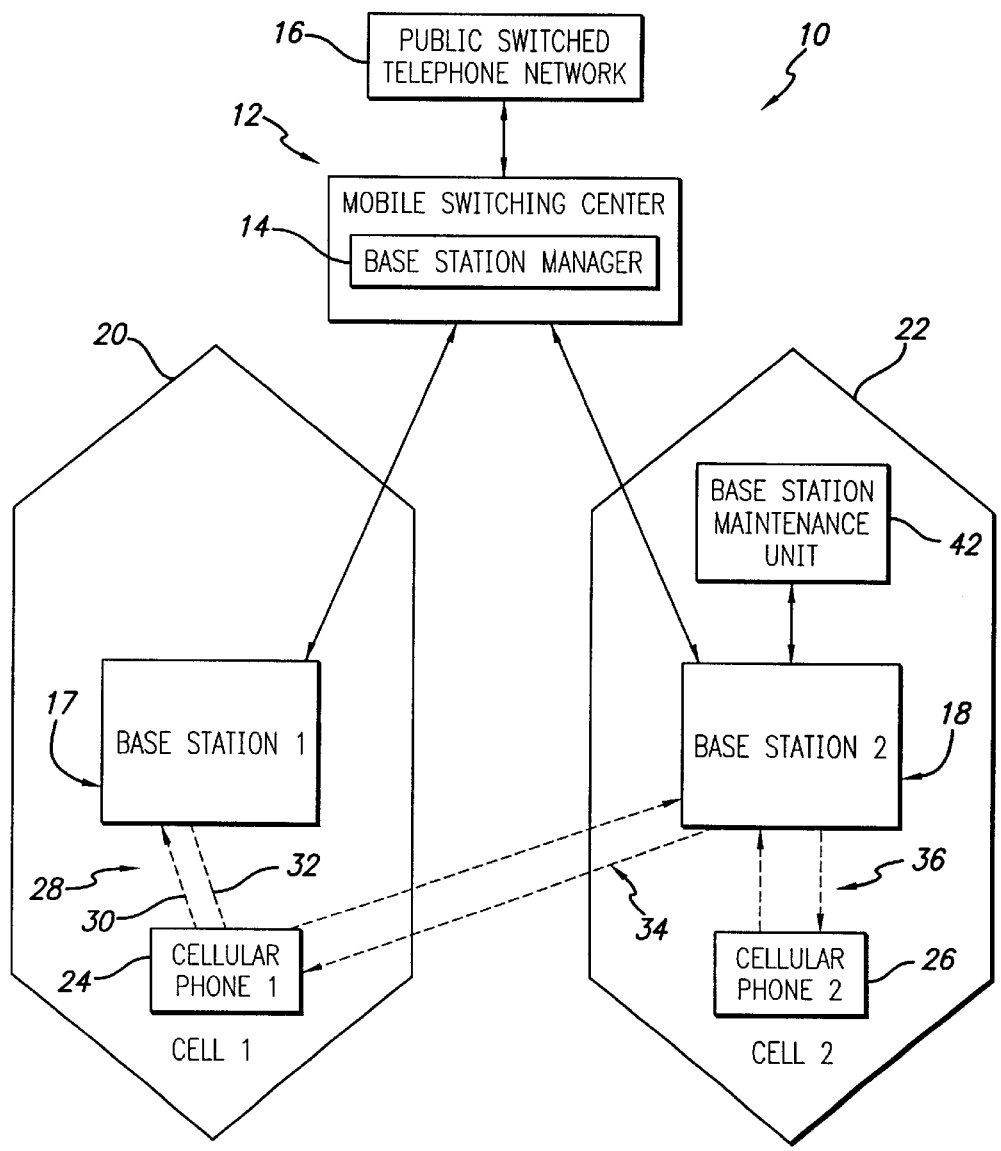
FIG. 1 is a block diagram of a cellular communications system constructed in accordance with the teachings of the present invention.

FIG. 1 is a block diagram of a cellular telephone system 10 constructed in accordance with the teachings of the present invention. The system 10 includes a plurality of mobile switching centers which communicate with a plurality of base stations in a number of cells as will be appreciated by those of ordinary skill in the art. In FIG. 1, a single mobile switching center is depicted along with two cells for the purpose of simplification. Those skilled in the art will appreciate that in practice, multiple switching centers and cell sites would be employed.

In FIG. 1, each mobile switching center (MSC) 12 is managed by a base station manager (BSM) 14. A public switched telephone network (PSTN) 16 routes calls from telephone lines and other networks (not shown) to and from the MSC 12. The MSC 12 routes calls from the PSTN 16 to and from the base stations (BTS) 17 and 18 associated with a first and second cells 20 and 22 respectively. In addition, the MSC 12 routes calls between base stations 17 and 18, i.e., from a source base station 17 to a target base station 18 and vice versa.

The source base station 17 directs calls to a first mobile station 24 within the first cell 20 via a first communications link 28. The communications link 28 is a two-way link having a forward link 32 and a reverse link 30. Typically when the base station 17 has established voice communications with the mobile station 24, the link 28 is characterized as a traffic channel. Although each base station 17, 18 is associated with only one cell, a base station often governs or is associated with several cells.

When the mobile station 24 moves from the first cell 20 to the second cell 22, the mobile station 24 is handed off to the target base station 18. In a soft handoff, the mobile station 24 establishes a second communications link 34 with the target base station 18, in addition to the first communications link 28, with the source base station 17. When mobile station 24 has crossed into the second cell 22, it may drop the first communications link 28.

In a hard handoff, the communications link 34 is not established. When the first mobile station 24 moves from the first cell 20 to the second cell 22, the link 28 to the source base station 17 is dropped and a new link is formed with the target base station 18. The communications links 28, 34, and 36 are Air-Interface radio links.

Figure 2:
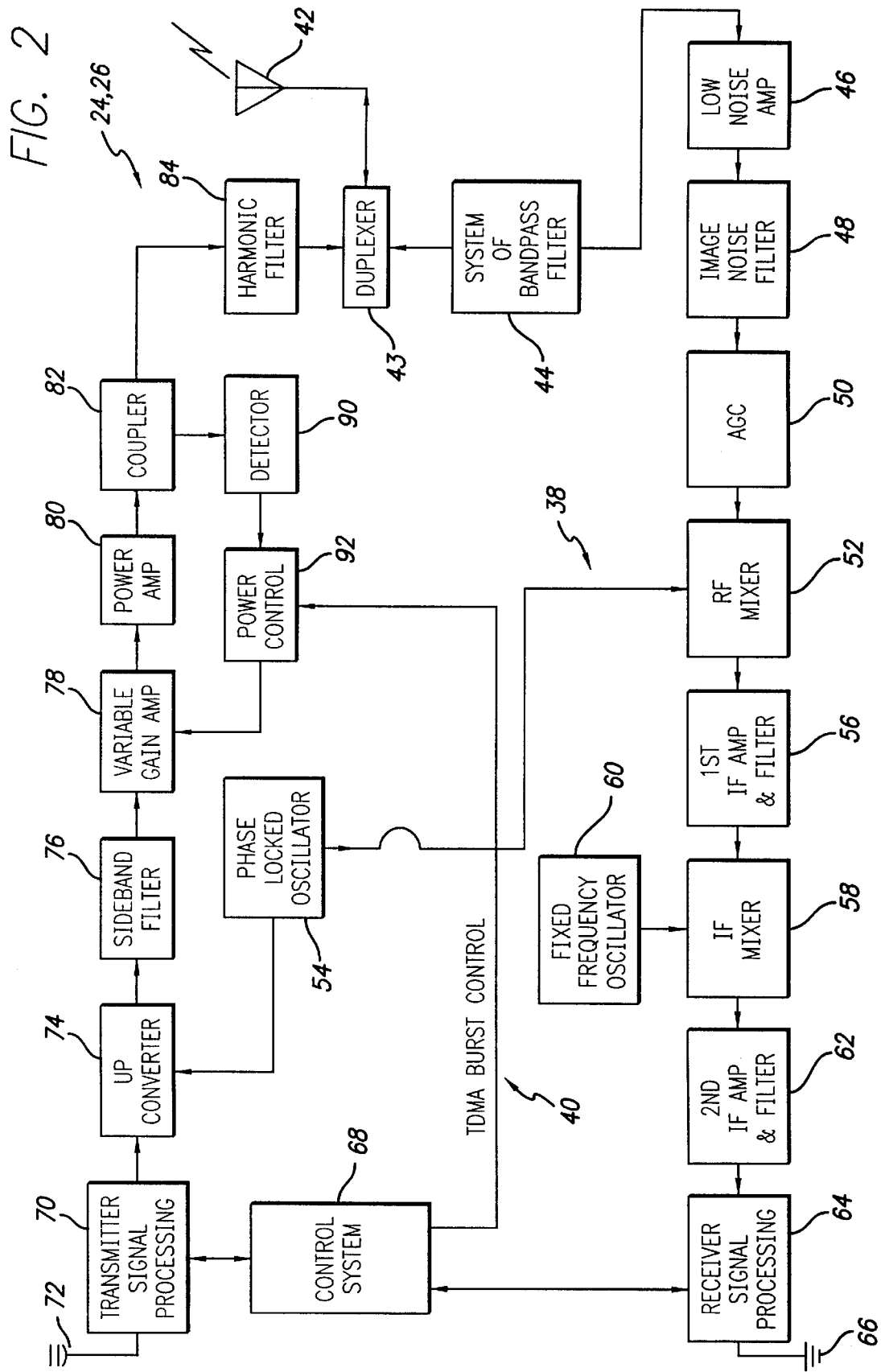
FIG. 2 is a simplified block diagram of a cellular telephone transceiver constructed in accordance with the teachings of the present invention.

FIG. 2 is a simplified block diagram of an illustrative cellular telephone transceiver constructed in accordance with the teachings of the present invention. Each cell phone (mobile unit) 24, 26 includes a receiver 38 and a transmitter 40. The receiver 38 includes an antenna 42 which feeds a received signal to a system of bandpass filters 44 via a duplexer 43. The output of the bandpass filter 44 is input to a low noise amplifier 46. An image noise filter 48 filters the output of the amplifier 46 and passes the filtered signal to an automatic gain control (AGC) circuit 50. The gain controlled signal is downconverted to an intermediate frequency by an RF mixer 52 using an input from a phase locked oscillator 54. The IF signal is amplified and filtered by a first IF amplifier and filter circuit 56 and input to an IF mixer 58. The IF mixer 58 demodulates the signal using an input from a fixed frequency oscillator 60 and provides the demodulated IF signal to a second IF amplifier and filter circuit 62. The output of the second IF amplifier and filter circuit 62 is input to a receiver signal processor 64 which processes the input signal in a conventional manner and provides outputs to a speaker 66 and to a control system 68.

The control system 68 is operationally coupled to a transmitter signal processing circuit 70 and operates therewith in a conventional manner. The transmitter signal processing circuit also receives input from a microphone or data source 72. The output of the transmitter signal processing circuit 70 is provided to an upconverter 74. The upconverter mixes the input signal with a signal provided by a phase locked oscillator 54. The output of the upconverter 74 is input to a sideband filter 76. The filtered output of the sideband filter is input to a variable gain amplifier 78. The output of the variable gain amplifier 78 is input to a power amplifier 80. The output of the power amplifier 80 is input to a harmonic filter 84 via a coupler 82. The harmonic filter output is fed to the duplexer 43 and output via the antenna 42.

The signal output by the amplifier 80 is coupled via the coupler 82 to a feedback loop comprising a peak detector 90 and a power control circuit 92. As discussed more fully below, the power control circuit 92 receives the power control signal from the control system 68 and outputs a gain control signal to the variable gain amplifier 78.

Figure 3:
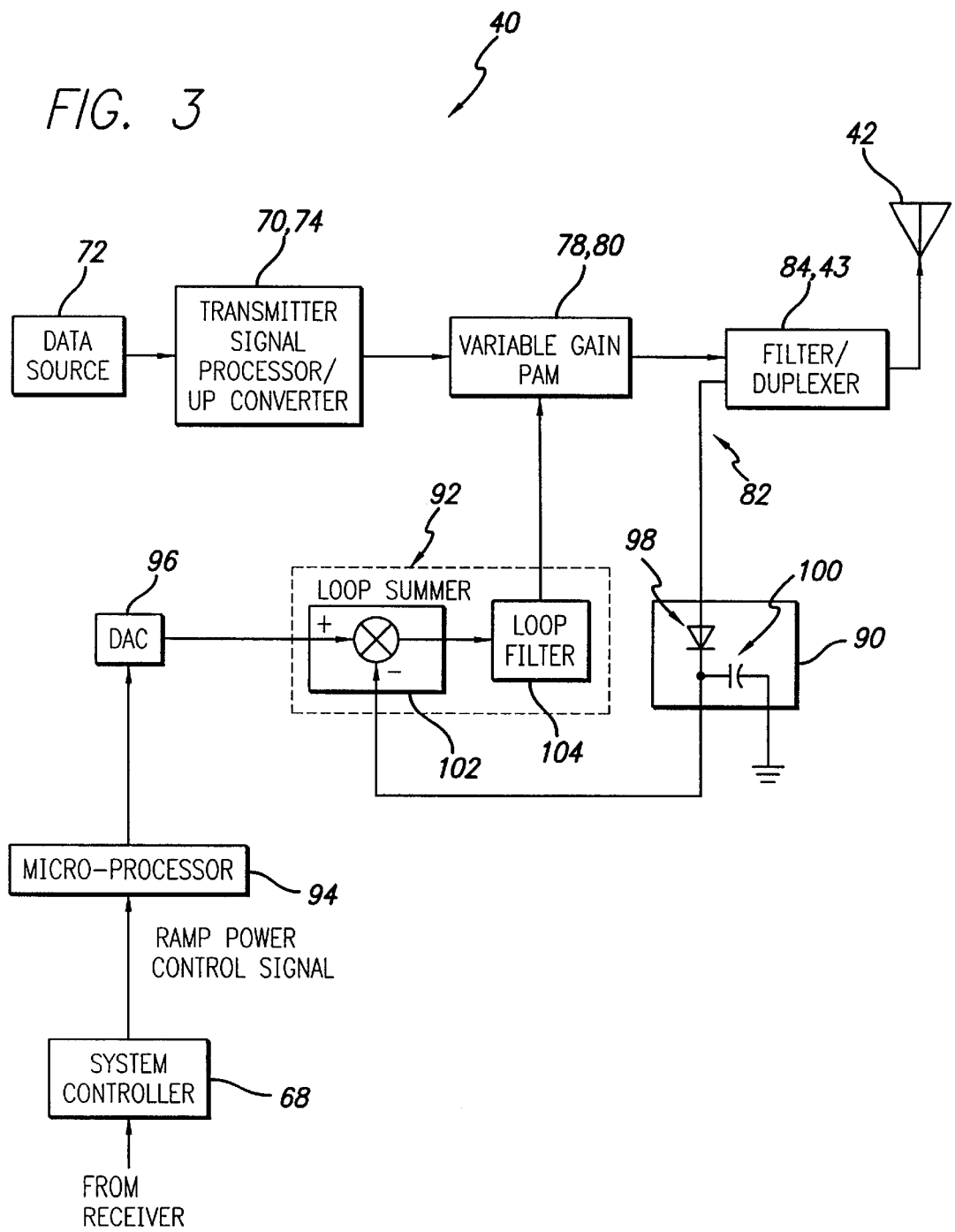
FIG. 3 is a simplified block diagram of the transmitter section of the cellular telephone showing the control system and the power control circuits in greater detail.

FIG. 3 is a simplified block diagram of the transmitter section 40 of the cellular telephone showing the control system and the power control circuits in greater detail. As shown in FIG. 3, the control system 68 feeds a microprocessor 94 which provides digital words to a digital-to-analog converter (DAC) 96. The DAC converts the digital word to an analog voltage which is provided to the power control circuit 92 as the output power control signal mentioned above.

The detector 90 includes a diode 98 and a capacitor 100. The diode 98 and the capacitor 100 are connected in a conventional manner to provide a peak detector. The output of the detector 90 is input to the power control circuit 92.

The power control circuit 92 includes a low pass filter 102 and a comparator 104. The low pass filter 102 receives the output of the detector 90 and subtracts it from a reference voltage $V_{ref}$ supplied by the DAC 96. The comparator 104 integrates the output of the low pass filter 102 and sets the feedback loop response time. Those skilled in the art will appreciate that other circuits may be used in lieu of the low pass filter. The output of the comparator 104 is used to set the gain of the variable gain amplifier 78.

Conventionally, power level control is effected by the transmission of a power level command by a base station 17 or 18 which is received by a cell phone receiver 38 and input to the control system 68. In the prior art, the microprocessor 94 would then input the power level command into a DAC 96 which was selected to cover the entire range of output power levels. The DAC 96 would supply a reference voltage $V_{ref}$ to the power control circuit 92 which sets the output power of the transmitter as discussed above.

Figure 4:
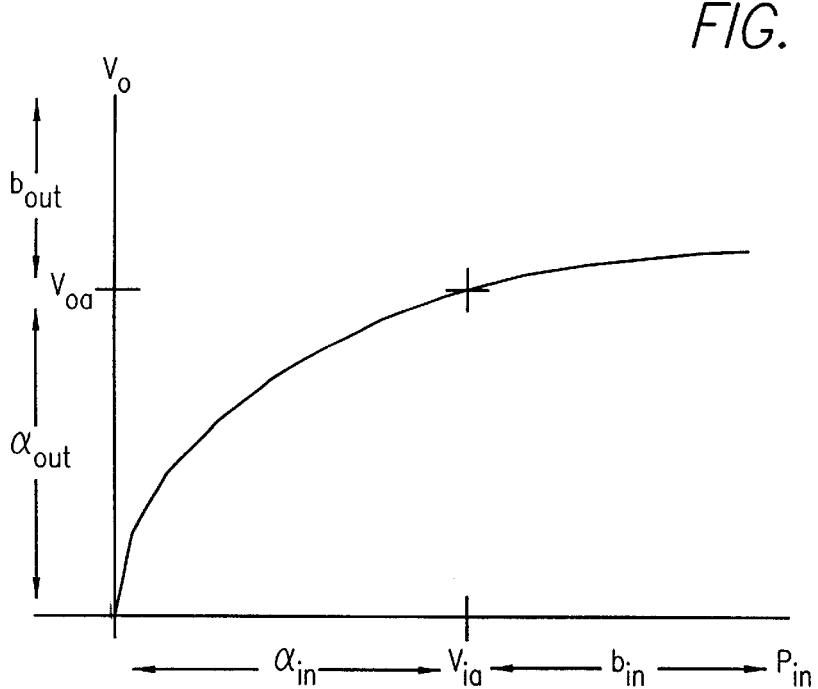
FIG. 4 is a graph of the DC output of the diode detector of the transmitter of the mobile station of the present invention as a function of RF input power.

However, inasmuch as diodes are commonly used in peak detectors in closed loop transmitters in cellular phones of conventional design, the detectors suffer from a nonlinearity as depicted in FIG. 4. As a result, the feedback loop is nonlinear and extremely sensitive at low power levels. These nonlinearities can cause the loop to go unstable. As the nonlinearities are more pronounced at the low power levels, loop accuracy problems tend to manifest at the low end of the power range.

The result is that least significant bit (LSB) changes in the digital input may not give enough resolution to achieve the accuracy at the output of the loop. This problem is more pronounced in regions of high nonlinearity. Thus an increased number of bits is required if accuracy is to be maintained.

The present invention addresses this problem by maximizing the resolution of the reference input signal over a wide range of power levels. This is achieved by scaling the reference voltage input to the control loop. In the illustrative embodiment shown in FIGS. 2 and 3, this is achieved by scaling the power level command by a first scale factor $k_1$ so that the maximum resolution of the DAC 96 coincides with a region of high detector sensitivity such as the region 'a' of FIG. 4. For the region 'b' outside of region 'a', a second scale factor $k_2$ is used. In the illustrative embodiment, the scale factor $k_1 \leq 1$ in region 'a' and $k_2 \geq 1$ in region 'b'. Hence, by mapping a desired output voltage to the known sensitivity of the detector 90, the resolution of the DAC can be applied in the region 'a' where it is most useful. This allows for much smaller step sizes in the region of greatest sensitivity than would otherwise be possible without using a DAC 96 with higher resolution over its entire range. Greater control over the reference voltage in the range of highest detector sensitivity allows for the feedback loop to be more accurate in the control of the output voltage. The novel and advantageous matching of the DAC sensitivity to that of the detector 90 is achieved in software in the illustrative embodiment.

Figure 5:
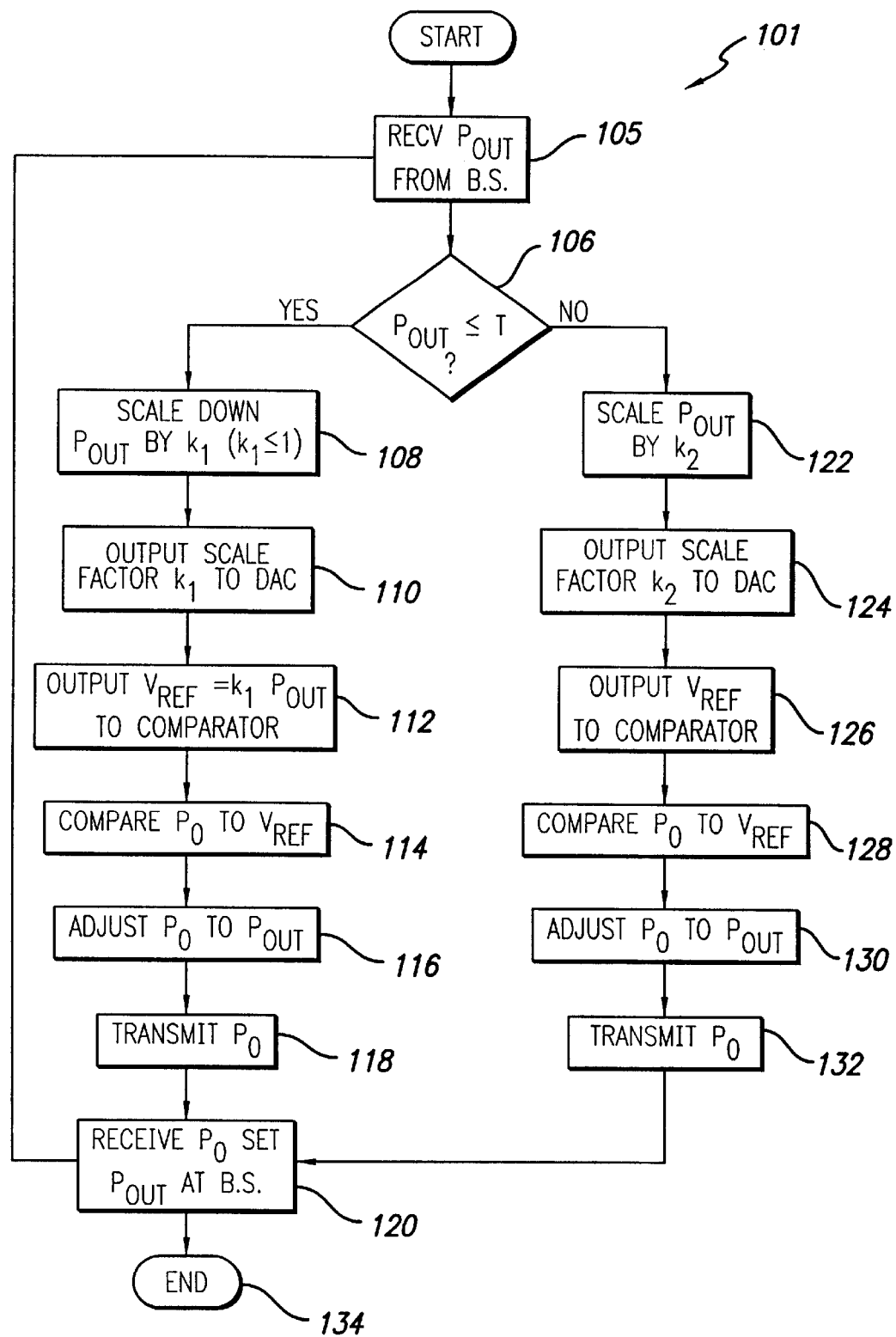
FIG. 5 is a flow diagram of a program run by a microprocessor in accordance with the illustrative embodiment of the present invention.

FIG. 5 is a flow diagram of the program run by the microprocessor 94 in accordance with the illustrative embodiment of the present invention. As shown in FIG. 5, the program 101 includes the steps of receiving the power level command $P_{out}$ at step 180 and comparing it to a threshold T at step 182. If the power level command $P_{out}$ is less than or equal to the threshold T, then at step 108, $P_{out}$ is scaled down by a first scale factor $k_1$ which is less than or equal to one (1). The scale factor $k_1$ is set to match the nonlinearity of the detector 90. The product of the scale factor and the power level command $k_1 P_{out}$ is input to the DAC 96 at step 110. At step 112, the DAC 96 outputs an analog voltage $V_{ref} = k_1 P_{out}$ to the comparator 104 of FIG. 3. At step 114, the comparator 104 compares the output of the detector $P_o$ to the reference voltage $V_{ref}$. The output of the comparator 104 is input to the variable gain amplifier 78 of FIG. 2 which adjusts the output of the transmitter $P_o$ to $P_{out}$ at step 116. At step 118, the transmitter 40 of FIG. 2 sends an output signal at the designated power level. At step 120, this signal is received at the base station which may set another power level and reinitiate the process.

If at step 182 $P_{out} > T$, then at step 122 a second scale factor $k_2$ is used, where $k_2$ is typically 1. At step 124 $k_2$ is output to the DAC 96 and the process continues through steps 126–132 which are identical to steps 112–118.

Figure 6:
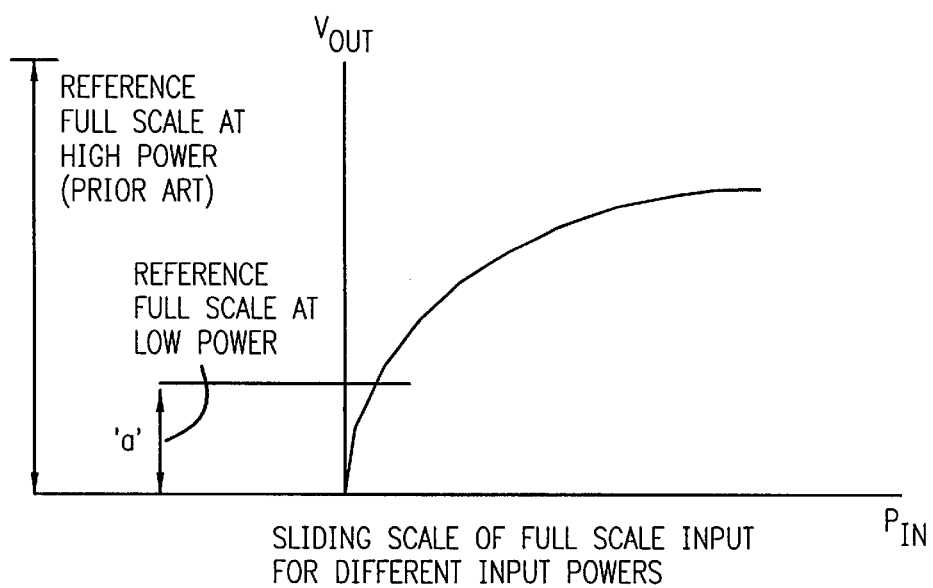
FIG. 6 is a graph of the DC output of the diode detector of the transmitter of the mobile station of the present invention as a function of RF input power showing the matching of DAC sensitivity with detector sensitivity in accordance with the teachings of the present invention.

FIG. 6 is a diagram which depicts how the range scale of the DAC is matched to the region 'a' of maximum detector sensitivity in accordance with the present teachings.

As is evident in FIG. 6, when the maximum resolution of the DAC 96 is applied to region 'a' as opposed to the full range scale as was the practice in the prior art, many additional increments are made available in the area of greatest detector sensitivity without the use of a DAC with higher resolution.

Thus, the present invention has been described herein with reference to a particular embodiment for a particular application. Those having ordinary skill in the art and access to the present teachings will recognize additional modifications applications and embodiments within the scope thereof. For example, the teachings of the present invention are not limited to closed-loop arrangements.

It is therefore intended by the appended claims to cover any and all such applications, modifications and embodiments within the scope of the present invention.

Accordingly,

What is claimed is:

1. A power control circuit for use with a transmitter comprising:

first means for providing a transmitter output signal;

second means for detecting the level of said output signal and providing a power level signal in response thereto, said second means including a detector having a nonlinear sensitivity;

third means for comparing said power level signal to a reference signal; and fourth means for scaling said reference signal whereby said output voltage is mapped to the nonlinear sensitivity of said detector, said fourth means including means for scaling said reference signal with a first scale factor over a first range if said power level signal is below a first threshold and for scaling said reference signal with a second scale factor over a second range if said power level signal is not below said first threshold, wherein said reference signal is mapped to compensate for said nonlinear sensitivity of said detector.

2. The invention of claim 1 wherein said fourth means includes a digital-to-analog converter.

3. The invention of claim 2 further including means for maximizing the resolution of said digital-to-analog converter to a region of high detector sensitivity over a first or a second range.

4. The invention of claim 3 wherein said means for maximizing includes a microprocessor.

5. The invention of claim 4 wherein said microprocessor is adapted to receive a power level command signal from a base station of a cellular telephone system.

6. The invention of claim 1 wherein said first means includes a variable gain amplifier.

7. A power control circuit for use with a transmitter comprising:

a variable gain amplifier for providing a transmitter output signal;

a detector having a nonlinear sensitivity for detecting the level of said output signal and providing a power level signal in response thereto;

a low pass filter for integrating the output of said detector to provide a linearized power level signal;

a comparator for comparing said linearized power level signal to a reference signal; and a microprocessor for scaling said reference signal with a first scale factor over a first range if said power level signal is below a first threshold and for scaling said reference signal with a second scale factor over a second range if said power level signal is not below said first threshold whereby said reference voltage and said output voltage are mapped to compensate for said nonlinear sensitivity of said detector.

8. The invention of claim 7 further including a digital-to-analog converter adapted to convert the output of said microprocessor to an analog representation of said reference signal.

9. The invention of claim 8 wherein said microprocessor is programmed to maximize the resolution of said digital-to-analog converter to a region of high detector sensitivity over said first or said second range.

10. The invention of claim 9 wherein said microprocessor is adapted to receive a power level command signal from a base station of a cellular telephone system.

11. A method for controlling the power of a signal output by a transmitter including the steps of:

detecting the level of a signal output by said transmitter with a detector having a nonlinear sensitivity and providing a power level signal in response thereto;

comparing said power level signal to a reference signal; and scaling said reference signal with a first scale factor over a first range if said power level signal is below a first threshold and for scaling said reference signal with a second scale factor over a second range if said power level signal is not below said first threshold, wherein said reference signal is mapped to compensate for said nonlinear sensitivity of said detector whereby said output voltage is mapped to the nonlinear sensitivity of said detector.

* * * * *